(12) United States Patent
Beck et al.

(10) Patent No.: US 8,115,426 B2
(45) Date of Patent: Feb. 14, 2012

(54) METHOD AND APPARATUS FOR CONNECTING A PHOTOVOLTAIC SYSTEM TO A POWER GRID

(75) Inventors: Bernhard Beck, Volkach OT Dimbach (DE); Thomas Neussner, Zeilitzheim OT Kolitzheim (DE); Constantin Wenzlik, Würzburg (DE)

(73) Assignee: Adensis GmbH, Dresden (DE)

( * ) Notice: Subject to any disclaimer, the term of this patent is extended or adjusted under 35 U.S.C. 154(b) by 371 days.

(21) Appl. No.: 12/540,020

(22) Filed: Aug. 12, 2009

(65) Prior Publication Data

US 2010/0090634 A1 Apr. 15, 2010

(30) Foreign Application Priority Data

Aug. 20, 2008 (DE) .................. 10 2008 038 542

(51) Int. Cl.
  *H02P 11/00* (2006.01)
  *H02J 5/00* (2006.01)
  *H02M 7/00* (2006.01)
(52) U.S. Cl. ......... 318/139; 318/480; 318/140; 363/102
(58) Field of Classification Search .................. 318/139, 318/140, 480, 432, 434, 609; 307/151; 363/41, 363/101, 102; 310/113; 136/244; 323/906, 323/299
See application file for complete search history.

(56) References Cited

U.S. PATENT DOCUMENTS

| | | | | |
|---|---|---|---|---|
| 4,131,827 A * | 12/1978 | Larrabee | | 318/46 |
| 4,494,180 A * | 1/1985 | Streater et al. | | 363/37 |
| 4,718,233 A * | 1/1988 | Barrett | | 60/496 |
| 4,999,560 A * | 3/1991 | Morishima et al. | | 318/779 |
| 5,187,651 A * | 2/1993 | Ekstrom | | 363/35 |
| 5,747,967 A * | 5/1998 | Muljadi et al. | | 320/148 |
| 6,774,299 B2 * | 8/2004 | Ford | | 136/244 |
| 7,126,294 B2 * | 10/2006 | Minami et al. | | 318/139 |
| 7,394,237 B2 * | 7/2008 | Chou et al. | | 323/299 |
| 7,609,019 B2 * | 10/2009 | Beck et al. | | 318/480 |
| 7,952,897 B2 * | 5/2011 | Nocentini et al. | | 363/41 |
| 2003/0011348 A1 * | 1/2003 | Lof et al. | | 322/37 |
| 2003/0169006 A1 * | 9/2003 | Allen | | 318/442 |
| 2005/0116671 A1 * | 6/2005 | Minami et al. | | 318/275 |
| 2010/0164302 A1 * | 7/2010 | Beck | | 307/151 |

FOREIGN PATENT DOCUMENTS

| | | |
|---|---|---|
| DE | 100 61 724 A1 | 3/2002 |
| DE | 20 2006 002 726 | 5/2006 |
| DE | 10 2005 000 998 | 7/2006 |
| DE | 10 2006 026 073 | 12/2007 |
| EP | 1 863 165 A1 | 12/2007 |

* cited by examiner

*Primary Examiner* — Eduardo Colon Santana
(74) *Attorney, Agent, or Firm* — Henry M. Feiereisen; Ursula B. Day

(57) ABSTRACT

An apparatus and a method for preparing connection of a photovoltaic system (Q1) as a first energy source to a power grid (13) by way of a motor generator set (5, 6, 7) is presented. The DC motor (5) is coupled to a three-phase generator (7) by way of a shaft (6), wherein the three-phase generator (7) can be connected to the power grid (13). It has been observed that connecting this type of apparatus to the small or varying power output of the photovoltaic system (Q1) can be difficult and time-consuming. To enable a clean and quick connection, the DC motor (5) is powered with electric DC current from a second DC current source (Q2), wherein the operation of the three-phase generator (7) is matched to the conditions in the power grid (13) with the help of the second DC current source (Q2), and wherein the photovoltaic system (Q1) is connected to the DC motor (5) and the second DC current source (Q2) is disconnected from the DC motor (5) only after a complete match has been attained. This enables a quick and precise connection of the photovoltaic system (Q1) to the power grid (13) with defined parameters using the three-phase generator (7).

10 Claims, 1 Drawing Sheet

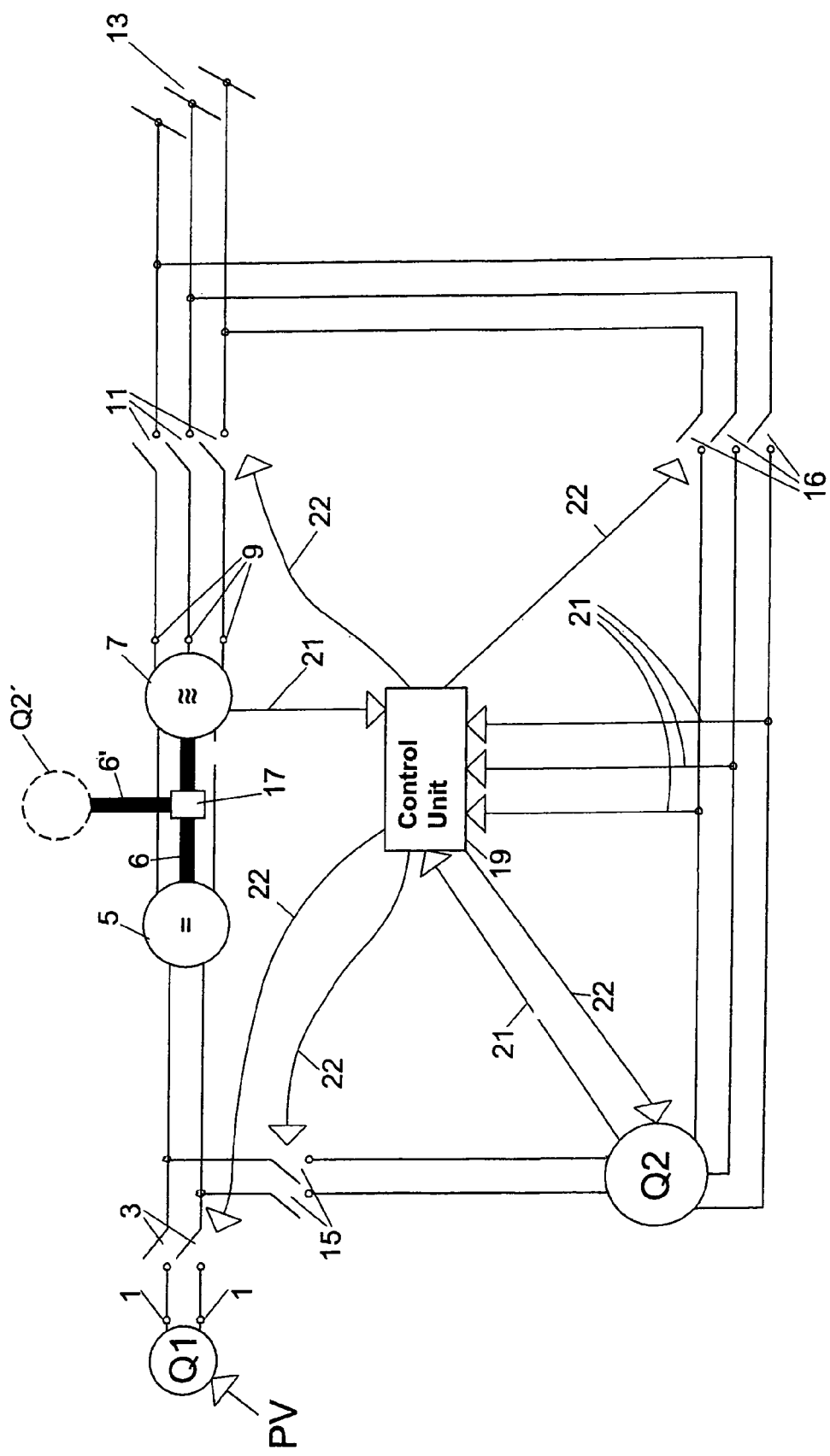

METHOD AND APPARATUS FOR CONNECTING A PHOTOVOLTAIC SYSTEM TO A POWER GRID

CROSS-REFERENCES TO RELATED APPLICATIONS

This application claims the priority of German Patent Application, Ser. No. 10 2008 038 542.5, filed Aug. 20, 2008, pursuant to 35 U.S.C. 119(a)-(d).

BACKGROUND OF THE INVENTION

The invention relates to a method for preparing synchronization of a motor-generator set for synchronization with a power grid, wherein a DC motor is connected by a shaft with a three-phase generator, with a photovoltaic system as a primary energy source for the DC motor, wherein the three-phase generator can be connected to a power grid. The invention also relates to an apparatus for carrying out the method.

Such method is suitable to feed the AC current or three-phase current generated by the three-phase generator in a large system to a power grid, preferably a public grid.

Photovoltaic systems are known where the entire DC current supplied by the photovoltaic modules is converted with an electric converter or inverter into AC current or three-phase current, which is then fed into the power grid. Currently, electric converters for large facilities are commercially available, which include semiconductor components and which have a power rating of up to 700 kW. Of course, these are rather expensive. For a system having an even greater power output, several electric inverters must be provided. For example, a modern solar facility with a capacity of 2.5 MW includes at least nine such electric inverters, with each of them having a capacity of 330 kW.

Although an electric inverter has a high-efficiency for energy conversion, it is known to react rather sluggishly due to the presence of capacitors with a rather large electric capacitance. Currently, such inverter requires between 20 seconds and three minutes before its control device can adapt to changes in incident solar energy.

It has been proposed in DE 10 2006 026 073 to employ a DC motor in combination with an AC generator driven by a common shaft (motor-generator set). DC motors and AC generators for such high power ratings are commercially available. Such combination is advantageous compared to using a plurality of electric inverters, because they are statistically less likely to be affected by failures. Another advantage is that less maintenance is required. It is also advantageous that only a single unit must be monitored during operation and that the service life of an electromechanical drive set can be many times that of electronic elements with proper maintenance.

DE 20 2006 002 726 U1, which forms the basis of this invention, discloses a motor-generator set operating in a solar facility. This publication, however, only addresses the mechanical aspects of the motor-generator set. It contemplates several pole wheels which are arranged on a common shaft, each having its own stator.

When operating this type of facility with the corresponding method, a clean and uninterrupted adaptation of the output parameters of the three-phase generator to the grid has proven to be complicated, which is necessary for connecting the three-phase generator to the power grid. This can be attributed to the fact that the corresponding control valuables change continually with the incident light intensity. With such "fidgety" input variables, achieving an acceptable switching time, where undesirable compensation currents may be tolerable, can take considerable time. Such compensation currents cause stress and hence undesirable aging of the affected components. Disadvantageously, generated solar energy cannot be supplied to the power grid during the adaptation process, i.e., until satisfactory connection conditions are attained.

SUMMARY OF THE INVENTION

It is therefore an object of the invention to modify the aforementioned method so that the connection conditions, i.e., the grid frequency and the phase angle, can be attained quickly and accurately, generating only small compensation currents. It is also an object to provide a system for carrying out the method.

The object is attained with respect to the method, in
   that initially the photovoltaic system is disconnected from the DC motor and that initially also the three-phase generator is disconnected from the power grid,
   that the generator set, in particular the DC motor, is supplied with energy from a second energy source,
   that the rotation speed and the phase angle of the three-phase generator is matched to the conditions in the power grid with the help of the second energy source, and
   that after matching is completed, the photovoltaic system is connected with the DC motor and the second energy source is disconnected from the DC motor.

The apparatus of the invention is characterized by
a) a photovoltaic system with a plurality of photovoltaic modules,
b) a DC motor which can be connected to the photovoltaic system, with the DC motor powered by the photovoltaic system with a DC voltage and a DC current,
c) a three-phase generator, which is coupled to the DC motor via a shaft and which can be connected to a power grid for supplying the generated AC voltage,
d) a second energy source which can be connected to the DC motor,
e) a control unit, which regulates the drive power from the second energy source for the DC motor, until the output of the three-phase generator has the same line frequency and phase angle as the power grid,
f) a switch which can be used to disconnect the second energy source from the DC motor, and
g) a switch which can be used to connect the output of the three-phase generator to the power grid.

The method and apparatus can advantageously be employed in large-scale facilities.

Preferably, a DC current source is used as secondary power source for driving the DC motor, independent of the photovoltaic system. In this way, the DC motor is shielded from the voltage and current variations produced by the photovoltaic modules. The machine set (DC motor/three-phase generator) can then be started under defined conditions. An unforeseen change of parameters, which may occur during startup of the machine set with the photovoltaic system, for example caused by occlusion from a passing cloud or by blown leaves covering the module, can thereby be prevented.

In the present invention, the photovoltaic system is viewed as the primary or first energy source or DC source. The second or secondary energy source can be any other energy source, regardless if this is an energy storage device or an energy-generating device. For example, a bank of rechargeable batteries can be used which can be supplied with power when the photovoltaic system produces excess power that cannot be fed to the power grid. Likewise, an electronic or electric rectifier can be employed. A DC source, which is supplied from the power grid, is preferred because its operation is extremely stable and synchronization can be attained quickly and accurately.

Advantageously, the second DC source can be connected to the input terminals of the DC motor with a switch. In particular, when the second DC source is supplied from the power grid, it does not make sense to configure it for permanent supply of power to the grid. If the DC source is a capacitor bank, then this capacitor bank must always be kept fully charged, firstly to prevent deterioration of the storage medium, but also to maintain a minimum power to the power grid, if the facility is used as a standalone unit. In the first case, the switch can be configured as a switching element which connects the photovoltaic system as the primary DC source with a DC motor at the same time the second DC source is disconnected from the DC motor.

An additional switching element should be provided between the three-phase generator and the power grid which, when actuated, disconnects the second energy source from the power grid while simultaneously connecting the three-phase generator to the power grid. This is advantageous for standard operation.

Advantageously, the second DC source may be sized to have a power rating below 20%, in particular below 6%, of the nominal power of the DC motor. Only the prevailing grid conditions (frequency, phase) must be matched, which is easier when employing a second DC source with a not overly coarse response.

BRIEF DESCRIPTION OF THE DRAWING

An exemplary embodiment of the invention will be described in more detail with reference to the appended drawing. The sole FIGURE shows a schematic diagram of an apparatus for connecting a photovoltaic system to a power grid.

DETAILED DESCRIPTION OF PREFERRED EMBODIMENTS

The reference symbol Q1 or PV in the FIGURE designates a photovoltaic system which includes a plurality of (unillustrated) photovoltaic modules and has a high power output of more than 1 MW. The output terminals 1 of the photovoltaic system Q1 are connected to a first switch 3 having output terminals which are connected to the input of a DC motor 5. In stationary operation, the photovoltaic system Q1 drives the DC motor 5, wherein the shaft 6 of the DC motor 5 is coupled to a three-phase generator 7. The three-phase generator 7 has three output terminals 9 which are connected to a second switch 11 configured to connect the three-phase generator 7 to a public three-phase power or distribution grid 13. Up to this point, this type of facility is conventional and need not be described in greater detail.

It has proven difficult in practical applications to synchronize the photovoltaic system Q1 (typical in the morning), because the incident solar radiation can be subject to strong variations and is typically insufficient to generate an adequate power output. This difficulty is countermanded in the present embodiment by employing a second energy source Q2, which in illustrated exemplary embodiment is a DC source that can be connected to the power grid 13. Its DC output terminals can be connected to the output of the DC motor 5 by way of a third switch 15, as indicated in the FIGURE by a solid line. Connection to the power grid 13 is accomplished with an additional switch 16.

Alternatively, an additional DC motor can be employed as the second energy source Q2', with the shaft 6' of the additional DC motor being coupled by way of a coupling 17 to the shaft 6 that couples the DC motor 5 to the three-phase generator 7. This is indicated in the FIGURE by a broken line.

A control unit 19 is connected with the second energy source Q2, the three-phase generator 7 and the power grid 13 by way of signals transmitted over data lines 21, which measure the desired and the regulated parameters and match, with the help of the energy source Q2 and based on the signals, the frequency and the phase angle of the three-phase generator 7 to the frequency and the phase angle of the power grid 13. Control lines 22 are provided to coordinate and execute the aforementioned switching operations on the switching elements 3, 11, 15, and 16.

What is claimed is:

1. A method for synchronizing an output from a motor-generator set with a power grid, the motor-generator set comprising a DC motor connected via a shaft with a three-phase generator and having a photovoltaic system as a primary energy source and a second DC energy source, said method comprising the steps of:
    connecting the second DC energy source with the DC motor to supply electric energy;
    matching a rotation speed and phase angle of the three-phase generator to conditions of the power grid with the supplied energy; and
    after matching is completed, disconnecting the second DC energy source from the DC motor and connecting the photovoltaic system with the DC motor as the primary energy source.

2. The method of claim 1, wherein after matching of the rotation speed and the phase angle of the three-phase generator have been completed, connecting the three-phase generator with the power grid before disconnecting the second DC energy source from the motor generator set.

3. The method of claim 1, wherein the second DC energy source is connectable with the input terminals of the DC motor via a switch.

4. The method of claim 3, wherein the switch is a switching element, which connects the photovoltaic system with the DC motor at the same time the second DC current source is disconnected from the DC motor.

5. The method of claim 1, wherein the second DC energy source is powered from the power grid.

6. The method of claim 1, wherein the second DC energy source is an electric energy storage device.

7. The method of claim 1, further comprising the steps of providing an additional switching element between the three-phase generator and the power grid; and actuating the additional switching element for coupling the three-phase generator to the power grid.

8. The method of claim 1, wherein power output of the second DC energy source is below 20% of a nominal power of the DC motor.

9. The method of claim 1, wherein the second DC energy source is a motor that is coupled to the shaft of the motor-generator set, with the motor when energized driving the motor-generator set.

10. Apparatus for synchronizing an output from a motor-generator set with a power grid, comprising:
    a photovoltaic system having a plurality of photovoltaic modules and representing a primary DC energy source;
    a second DC energy source;
    a three-phase generator having an output switchably electrically connected to a power grid having for supplying a generated AC voltage;

a DC motor coupled to the three-phase generator by a shaft and switchably electrically connected to one of the photovoltaic system and the second DC energy source; and a control unit, which controllably drives the DC motor from the second DC energy source, until a line frequency and phase angle of the power grid matches a line frequency and phase angle at the output of the three-phase generator, whereafter the control unit disconnects the second DC energy source from the DC motor and connects the photovoltaic system to the DC motor as primary DC energy source.

* * * * *